(12) United States Patent
Anderson

(10) Patent No.: US 12,396,414 B2
(45) Date of Patent: Aug. 26, 2025

(54) AQUAPONIC GREENHOUSE WITH SUSPENDED HYDROPONIC PLANTER AND IRRIGATION SYSTEM GEOTHERMAL HEAT EXCHANGE SYSTEM AND HYDRONIC RADIANT FLOORING SYSTEM

(71) Applicant: Trent Anderson, Ithaca, NY (US)

(72) Inventor: Trent Anderson, Ithaca, NY (US)

(73) Assignee: Jordyn Wyrd, LLC, Ithaca, NY (US)

( * ) Notice: Subject to any disclaimer, the term of this patent is extended or adjusted under 35 U.S.C. 154(b) by 0 days.

(21) Appl. No.: 17/862,352

(22) Filed: Jul. 11, 2022

(65) Prior Publication Data

US 2023/0012188 A1 Jan. 12, 2023

Related U.S. Application Data

(60) Provisional application No. 63/220,437, filed on Jul. 9, 2021.

(51) Int. Cl.
*A01G 31/02* (2006.01)
*A01K 63/04* (2006.01)

(52) U.S. Cl.
CPC ............ *A01G 31/02* (2013.01); *A01K 63/045* (2013.01); *A01G 31/065* (2025.01)

(58) Field of Classification Search
CPC .......... A01G 31/02; A01G 9/24; A01G 9/245; A01G 9/246; A01G 9/247; A01G 9/26; A01G 31/06; A01G 2031/006; A01K 63/045
See application file for complete search history.

(56) References Cited

U.S. PATENT DOCUMENTS

| | | | |
|---|---|---|---|
| 5,046,451 A | * | 9/1991 | Inslee ................. A01K 61/10 210/167.26 |
| 10,004,180 B1 | * | 6/2018 | Stephan ................. A01G 9/14 |
| 10,197,338 B2 | | 2/2019 | Melsheimer |
| 10,687,485 B2 | | 6/2020 | Villamar |
| 10,897,861 B2 | | 1/2021 | Pisarenko et al. |
| 11,310,976 B1 | | 4/2022 | Cross |
| 2003/0070353 A1 | * | 4/2003 | Mercurio ............... A01G 9/242 47/17 |

(Continued)

FOREIGN PATENT DOCUMENTS

| | | |
|---|---|---|
| CN | 202 941 214 U | 5/2013 |
| JP | S54 15843 A | 2/1979 |

(Continued)

OTHER PUBLICATIONS

KR 20060089428 A machine translation (Year: 2006).*

(Continued)

*Primary Examiner* — Son T Nguyen
(74) *Attorney, Agent, or Firm* — Saile Ackerman LLC; Stephen B. Ackerman

(57) ABSTRACT

An aquaponic greenhouse is described comprising at least one hydroponic planter, at least one aquatic tank configured to support aquatic life, an irrigation system linking the at least one hydroponic planter and said at least one aquatic tank; a biofilter configured to process waste from the aquatic life to be used to provide nutrients to plants in the at least one hydroponic planter, a geothermal heat exchange system; and a hydronic radiant flooring system.

18 Claims, 8 Drawing Sheets

(56) References Cited

U.S. PATENT DOCUMENTS

| | | | | |
|---|---|---|---|---|
| 2009/0307973 A1* | 12/2009 | Adams | ................ | A01G 31/06 47/62 C |
| 2019/0254243 A1* | 8/2019 | Friesen | ................ | A01G 9/18 |
| 2020/0390047 A1* | 12/2020 | Pisarenko | ............ | G01N 33/004 |

FOREIGN PATENT DOCUMENTS

| | | | | |
|---|---|---|---|---|
| KR | 20060089428 A | * | 8/2006 | |
| KR | 20140001660 A | * | 1/2014 | |
| KR | 2014 0048509 A | | 4/2014 | |
| KR | 20150134546 A | * | 12/2015 | |
| KR | 101894374 B1 | * | 9/2018 | |
| KR | 2019 0090912 A | | 8/2019 | |
| KR | 102 065 453 B1 | | 1/2020 | |
| KR | 10-2020-0021704 A | | 3/2020 | |
| KR | 20200021704 A | * | 3/2020 | |
| KR | 20200057689 A | * | 5/2020 | |
| WO | WO-2018191276 A1 | * | 10/2018 | ............. A01K 61/59 |

OTHER PUBLICATIONS

Radiant Heating article, pp. 1-8. (Year: 2020).*
Wayback machine date for Radiant Heating article. (Year: 2020).*
PCT International Search Report, International Application No. PCT/US2022/036739, Applicant: Anderson, Trent, Mail date: Feb. 16, 2023, 3 pages.
PCT Written Opinion of the International Searching Authority, International Application No. PCT/US2022/036739, Applicant: Anderson, Trent, Mail date: Feb. 16, 2023, 9 pages.
European Search Report, Application No. 22842726.6-1105 / 4366508 PCT/US2022036739, Applicant: Jordyn Wyrd, LLC, Mail date May 6, 2025, 9 pages.

\* cited by examiner

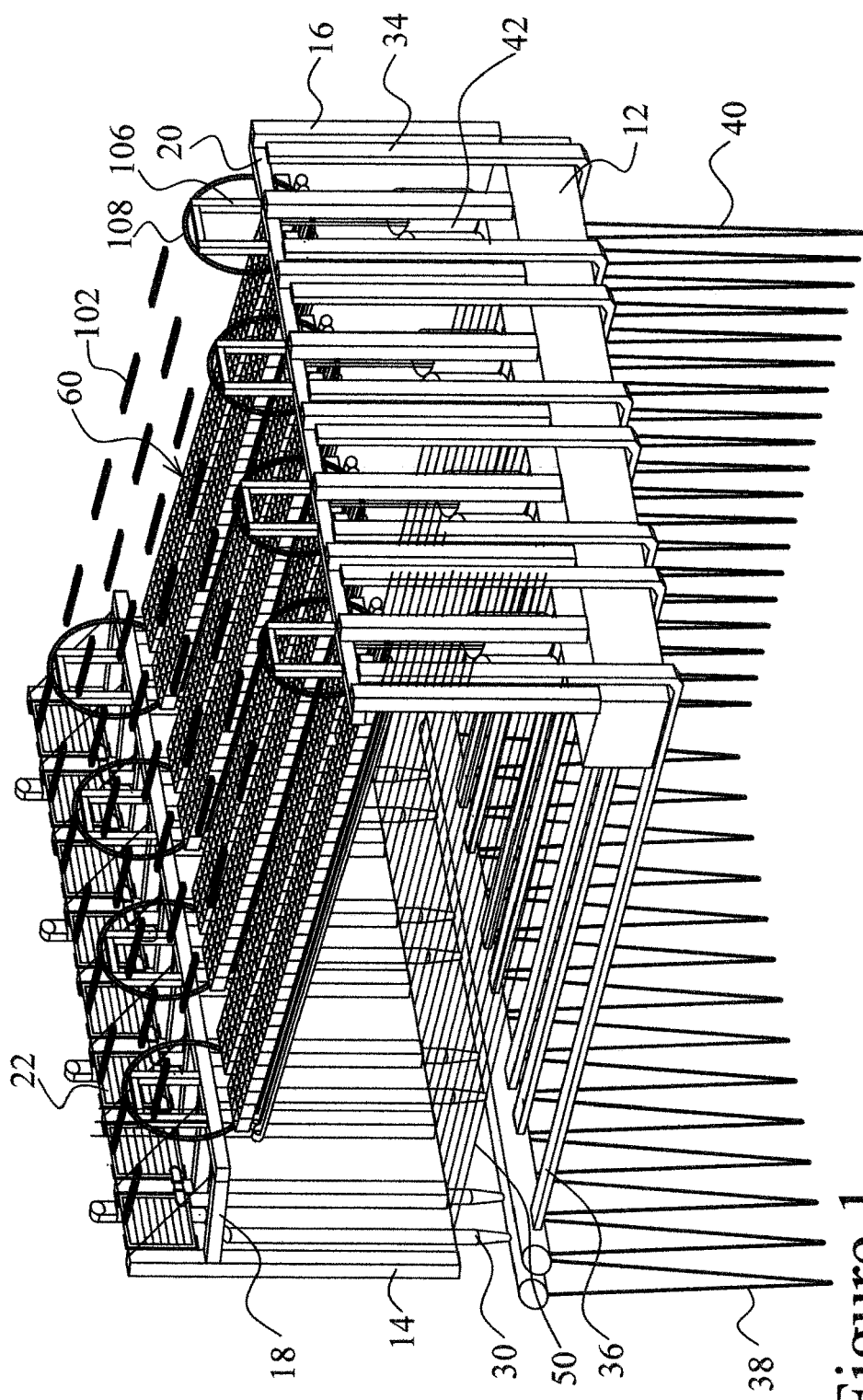
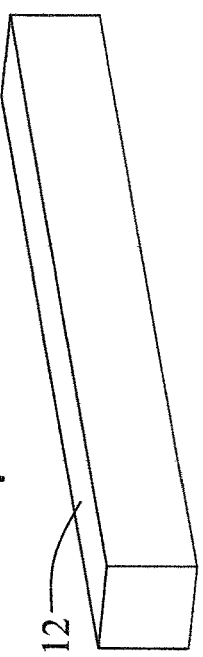
Figure 1
Figure 2

AQUAPONIC GREENHOUSE WITH SUSPENDED HYDROPONIC PLANTER AND IRRIGATION SYSTEM GEOTHERMAL HEAT EXCHANGE SYSTEM AND HYDRONIC RADIANT FLOORING SYSTEM

This application claims benefit of U.S. Provisional application Ser. No. 63/220,437, filed on Jul. 9, 2021, which is herein incorporated by reference in its entirety.

TECHNICAL FIELD

This disclosure relates to an aquaponic greenhouse system, and more particularly, to an aquaponic greenhouse system with an integrated hydroponic planter and irrigation system, geothermal heat exchange system, and hydronic radiant flooring system.

BACKGROUND

Several U.S. Patents describe greenhouse systems including U.S. Pat. Nos. 10,197,338 (Melsheimer), 10,687,485 (Villamer), 11,310,976 (Cross), and 10,897,861 (Pisarenko et al).

SUMMARY

A principal objective of the present disclosure is to provide an aquaponic greenhouse.

Another objective of the present disclosure is to provide an aquaponic greenhouse having a hydroponic planter and irrigation system.

Another objective is to provide an aquaponic greenhouse having a hydroponic planter and irrigation system with an integrated aquaponic system comprising at least one tank for aquatic life and a biofilter to process waste from the aquatic life to be used to provide nutrients to the plants in the hydroponic planter.

Yet another objective is to provide an aquaponic greenhouse having a hydroponic planter and irrigation system with an integrated aquaponic system comprising at least one tank for aquatic life wherein temperature-controlled water in the tank circulates through a water reservoir system and hydronic radiant flooring system to provide temperature regulation and distribution to the entire greenhouse.

A further objective is to provide an aquaponic greenhouse having a hydroponic planter and irrigation system with an integrated aquaponic system having both air and water geothermal storage systems in combination with a hydronic radiant flooring system to provide temperature regulation and distribution to the entire greenhouse.

In accordance with the objectives of the disclosure, an aquaponic greenhouse comprising at least one hydroponic planter, at least one aquatic tank configured to support aquatic life, an irrigation system linking the at least one hydroponic planter and the at least one aquatic tank, a biofilter configured to process waste from the aquatic life to be used to provide nutrients to plants in the at least one hydroponic planter, a geothermal heat exchange system, and a hydronic radiant flooring system, the geothermal heat exchange system and the hydronic radiant flooring system configured to regulate air and water temperatures within the greenhouse.

Also in accordance with the objectives of the disclosure, an aquaponic greenhouse is achieved comprising at least one hydroponic planter, at least one aquatic tank configured to support aquatic life, an irrigation system linking the at least one hydroponic planter and the at least one aquatic tank, a biofilter configured to process waste from the aquatic life to be used to provide nutrients to plants in the at least one hydroponic planter, a series of water reservoirs connected to the at least one aquatic tank wherein the series of water reservoirs are configured to receive water pumped from the at least one aquatic tank, a heating mechanism associated with the series of water reservoirs wherein a temperature of the water pumped into the water reservoirs is increased to within a specific range, a network of underground tubing between the at least one aquatic tank and the series of water reservoirs wherein a temperature of the water pumped through the network of underground tubing into the water reservoirs is decreased to within a specific range, a hydronic radiant flooring system comprising a series of in-floor tubing having an inlet point connected to an exit point of the series of water reservoirs and having an outlet point at the at least one aquatic tank wherein the hydronic radiant flooring system is configured to redistribute heat collected in the series of water reservoirs to flooring of the greenhouse to provide air temperature within a specific range, at least two inlet ducts located at one inside wall of the greenhouse and extending towards a top of the greenhouse, at least two outlet ducts located at an opposite inside wall of the greenhouse and extending to lower parts of the greenhouse, an inlet duct fan connected to each of the inlet ducts, and a network of underground tubing connecting the inlet ducts to the outlet ducts wherein the inlet duct fans are configured to pull air from the top of said greenhouse through the network of underground tubes where the air is cooled and thereby releasing cooler air through the outlet ducts.

Also in accordance with the objectives of the disclosure, an aquaponic greenhouse having an automation system is achieved comprising at least one hydroponic planter, at least one aquatic tank configured to support aquatic life, an irrigation system linking the at least one hydroponic planter and the at least one aquatic tank, a biofilter configured to process waste from the aquatic life to be used to provide nutrients to plants in the at least one hydroponic planter, a geothermal heat exchange system, a hydronic radiant flooring system, the geothermal heat exchange system and the hydronic radiant flooring system configured to regulate air and water temperatures within the greenhouse, and the automation system comprising a plurality of sensors and devices connected to a plurality of controllers and microcontrollers, a database server configured to collect and store real time data sent from the controllers, a computer processor configured to provide communication between the controllers and microcontrollers wherein each of the controllers and microcontrollers is configured to operate in manual and automatic modes, and a user interface configured to allow a user to monitor and access data and set modes of operation.

BRIEF DESCRIPTION OF THE DRAWINGS

In the accompanying drawings forming a material part of this description, there is shown:

FIG. 1 is an elevated corner view of the entire greenhouse and substructure in a preferred embodiment of the present disclosure.

FIG. 2 is a corner view of a water tank in the preferred embodiment of the present disclosure.

DETAILED DESCRIPTION

The present disclosure details a greenhouse system according to the objectives above. FIG. 1 shows an elevated corner view of one example of a greenhouse system of the present disclosure.

Figure 9:
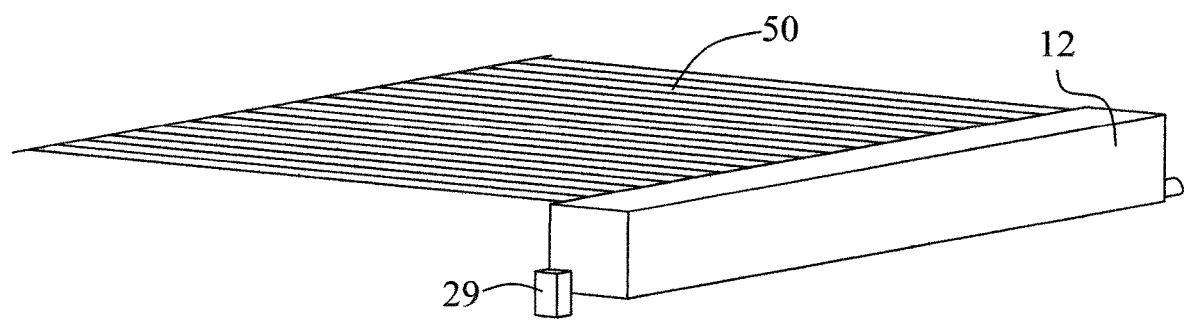
FIG. 9 is an orthogonal view of the hydronic radiant flooring system in the preferred embodiment of the present disclosure.
Figure 10:
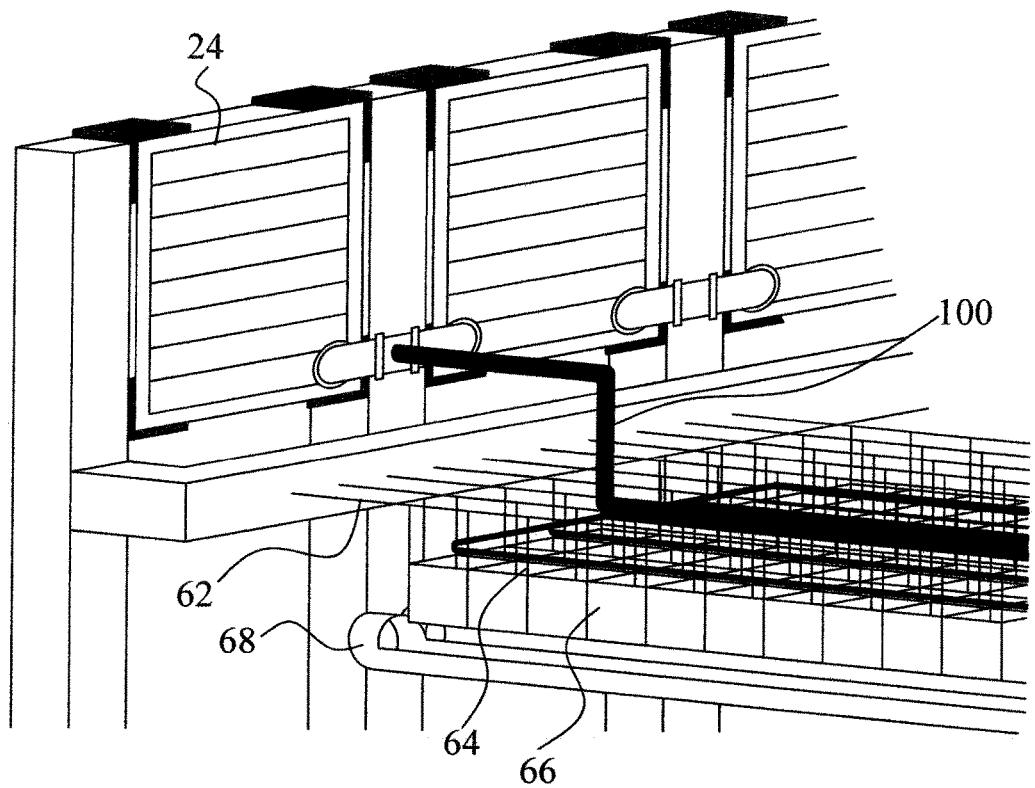
FIG. 10 is an enlarged view of a first portion of the suspended hydroponic planters in the preferred embodiment of the present disclosure.

The functional and architectural design consists of several main Systems and Structures, shown in FIG. 1 and in more detail in the following figures:

Fish Tank and Biofiltration System (FIGS. 2-4)
North & South Wall Support Structures (FIG. 5)
Elevated Water Reservoir System (FIG. 6)
Geothermal Heat Exchange Systems (FIG. 7 Air & FIG. 8 Water)
Hydronic Radiant Flooring System (FIG. 9)
Suspended Hydroponic Planter and Irrigation System (FIG. 10)

Each of these Systems, their components, placement, purpose, individual function(s), and relationship(s) with other Systems will be described in an effort to provide functional detail of the operational mechanics of the entire greenhouse ecosystem.

Fish Tank and Biofiltration System:

This System consists of a tank 12 (FIGS. 1 and 2) or series of tanks, and a connected biofilter (FIGS. 3 and 4) used to clean and recirculate water back to the tank. Multiple tanks could be connected by aligning matching holes on the two ends of the tanks that are being joined and connecting them with piping. Alternatively, partitions could be used to created separate spaces within a larger tank which would still allow water to flow naturally between partitions. The purpose of the tank is multifaceted:

1. The tank provides a home for the aquatic life.
2. The waste produced by the aquatic life is collected in the biofilter. This provides essential nutrients to feed and water the plants located in the Suspended Hydroponic Planter and Irrigation System (FIG. 10).
3. The temperature-controlled water in the tank circulates through the Elevated Water Reservoir System (FIG. 6) and Hydronic Radiant Flooring System (FIG. 9) to provide temperature regulation and distribution to the entire greenhouse.

To facilitate the downward water flow from the Elevated Reservoir Systems, and to maximize usable space, the top of the tank is placed just below the exit points of the PEX (Cross-linked polyethylene) tubing of the Hydronic Radiant Flooring System in the greenhouse floor. With the Fish Tank in this position, preferably below ground, the Nutrient Tanks 42 belonging to the Suspended Hydroponic Planter and Irrigation System can be mounted to the South Wall Support Structure 16, above the Fish Tank, conveniently positioning them directly below the exit points of the Suspended Hydroponic Planter and Irrigation System, and opening usable floor space that would otherwise be taken by the Nutrient Tanks. By placing the Fish Tank (preferably about 30-40 feet long) along the entire south wall, sitting in-ground, slightly below the greenhouse floor, the fish tank not only operates as a home for the aquatic life, but also it allows for the filtered water from the fish tank to be pumped to the back of the greenhouse, up through the Elevated Reservoir System, down through the Hydronic Radiant Flooring System, and back to the tank to facilitate consistent, even heat distribution.

While the present disclosure refers to north and south walls, and there would of course be other walls and a roof on a greenhouse such as would be the basis of the present disclosure, orientation of the greenhouse would not necessarily have to be strictly along north/south/east/west lines, but this approximate orientation is desirable since a southern exposure (in the northern hemisphere) receives more incoming sunlight, and a northern exposure receives less.

Figure 3:
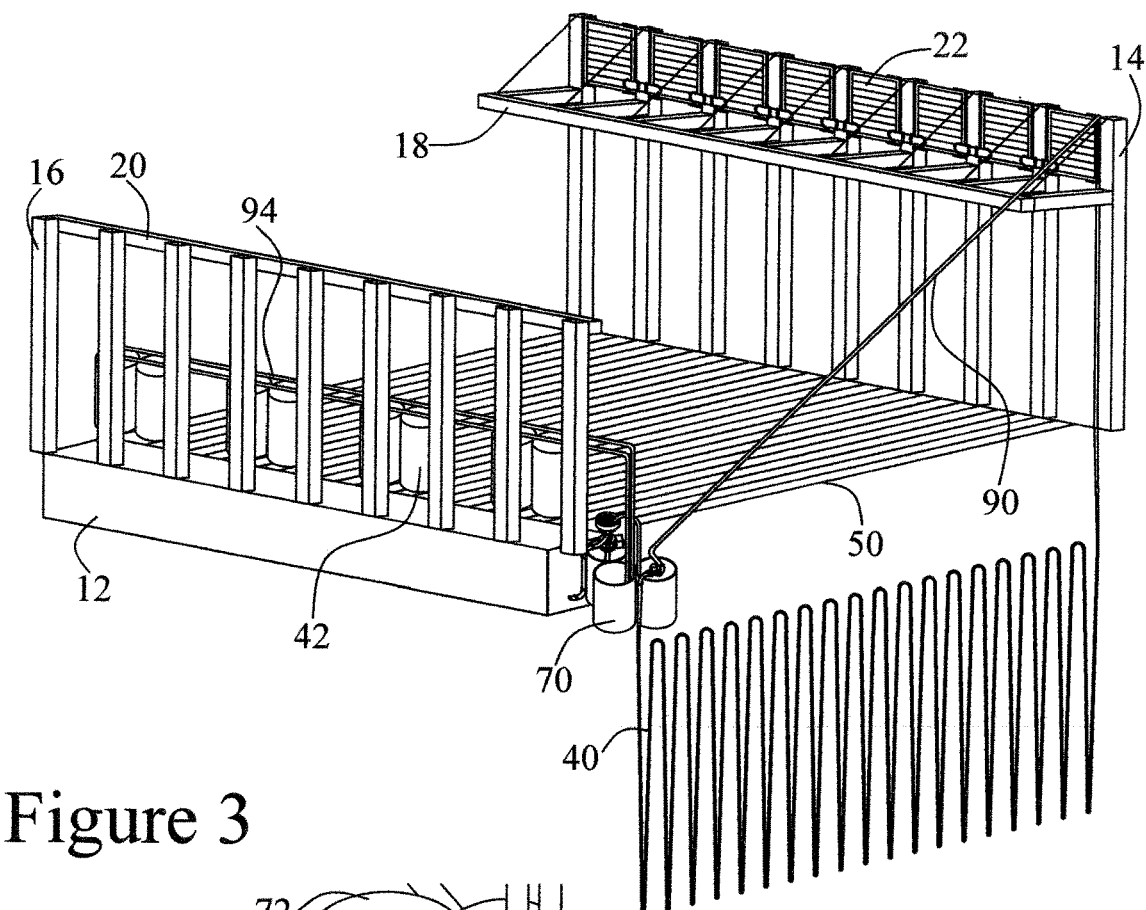
FIG. 3 is an orthogonal view of the water flow system between the nutrient tanks and the elevated reservoir system in the preferred embodiment of the present disclosure.
Figure 13:
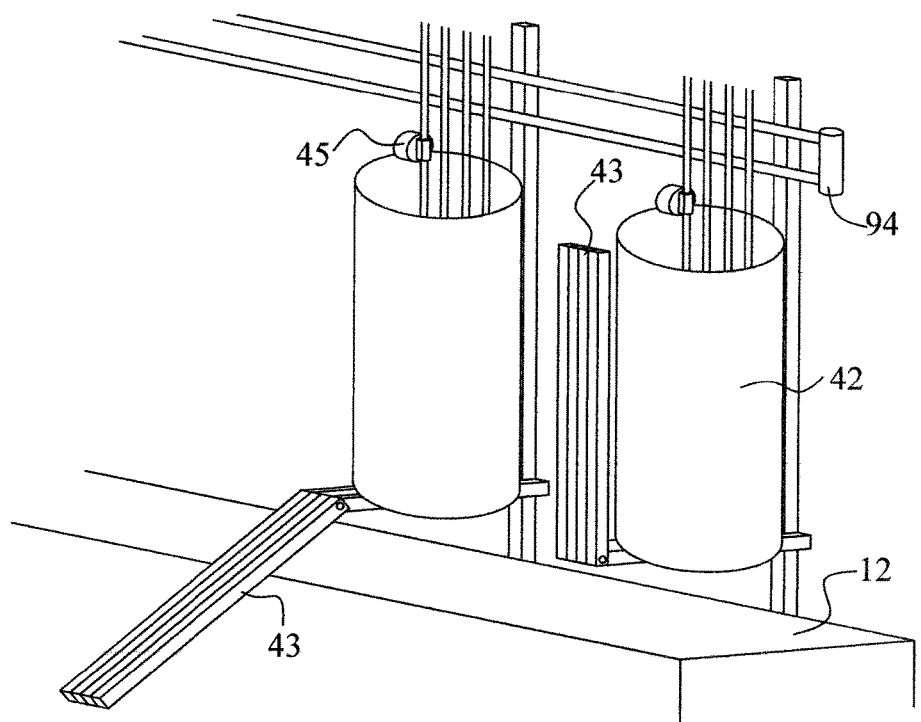
FIG. 13 is an enlarged view of the nutrient tanks over the fish tank in the preferred embodiment of the present disclosure.

FIG. 3 illustrates an example of the plumbing for the aquaponic system. Fish tank 12 is illustrated along the front wall of the greenhouse. Nutrient tanks 42 are mounted above the fish tank 12. A hinged ramp 43, shown in FIG. 13, can be used to reach the Nutrient Tanks 42 mounted above the Fish Tank (when needed), which, when down, extends across the top of the Fish Tank allowing a person access. The Fish Tank is in the ground for better temperature stability and so that water can flow to it without needing extra pumping above ground. FIG. 13 shows nutrient tanks 42 as single tanks. FIG. 3 shows nutrient tanks as double tanks. Either configuration will work.

Nutrients for the plants come from two sources: a) fish waste, and b) hydroponic additives. Mixing of the two is done after filtration of the fish water wherein the solids are removed, and then the tank of filtered water can have any additional needed nutrients added before going to the nutrient tanks, and then being applied to the plants.

Figure 4:
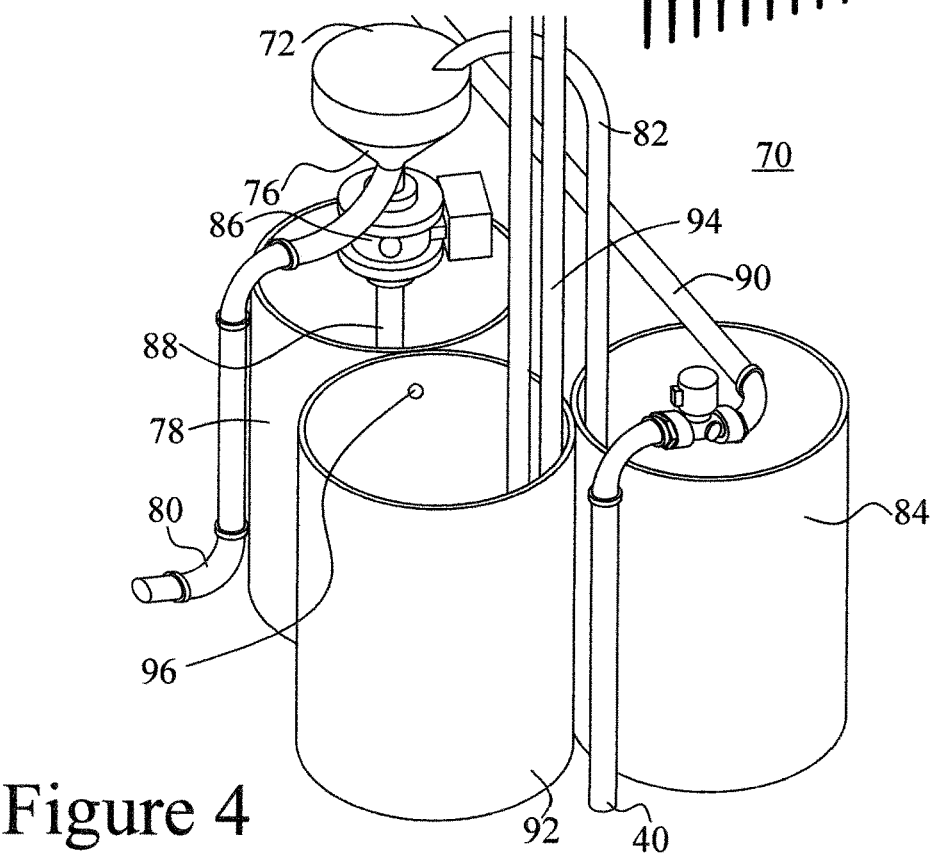
FIG. 4 is an enlarged view of the biofilter system shown in FIG. 3 in the preferred embodiment of the present disclosure.

An exemplary biofilter system 70 is illustrated in more detail in FIG. 4.

1. Biofilter
   a. The Biofilter is positioned just outside the Fish Tank 12, slightly below the water level of the Fish tank, mounted above the Processing Water Holding Tank 78, and connected directly to an opening at the bottom of the Fish Tank through piping 80.

b. The Biofilter consists of two chambers separated by a porous basket or sieve enclosing floating filter media
   i. The top chamber 72, above the floating filter media, holds filtered water and has an overflow 82 connected directly to the Filtered water Holding Tank 84.
   ii. The funnel shaped bottom chamber 76, below the floating media, is equipped with an open/close valve 86 which controls the flow of the bio-matter rich water through a drainage pipe 88 exiting into Processing Water Holding Tank 78.
c. Water from the Fish Tank naturally flows into the Biofilter through piping 80 and enters into the bottom, funnel shaped chamber 76.
d. When filtering, the open/close valve 86 located at the bottom of this funnel shaped chamber is in the closed position, allowing water to completely fill this chamber, pressing the floating filter media to the top of the containing basket/sieve, effectively filtering the water as it enters the top chamber of the Biofilter, and overflows into the Filtered Water Holding Tank 84.
e. When flushing, the open/close valve is in the open position, allowing the water in the bottom chamber to exit the drainage pipe 88 and enter the Processing Water Holding Tank 78.

2. Filtered Water Holding Tank 84
a. This tank is used as an overflow holding tank for the filtered water passing through the floating media of the Biofilter.
b. The Filtered water in this holding tank is pumped either directly to the Elevated Reservoir System 22 through piping 90 or indirectly through the Geothermal Heat Exchange System 40 and then to the Elevated Reservoir System 22.

3. Processing Water Holding Tank 78
a. Bio-mater rich water enters this tank through the drainage pipe 88 on the bottom chamber 76 of the Biofilter, which is located directly above the tank, and is controlled by a valve 86.
   This tank is used to further separate bio-matter from the water by injecting air through an airstone at the bottom of the tank, and placing additional floating filter media at the top of the tank 78. The airstone, or diffuser, is used to create large quantities of tiny bubbles by forcing air through the small holes of the device.
b. Injecting air into this water helps to further break down the bio-matter as well as jump start the nitrification process needed to convert the separated bio-matter into nutrient rich water used to support plant life in the Suspended Hydroponic Planter and Irrigation System
   i. The floating filter media at the top of this tank filters bio-matter as it overflows through pipe 96 into the Processed Nutrient Rich water Holding Tank 92.
c. A drainage valve, located at the bottom of this tank, can be used to remove excess bio-matter that sinks to the bottom of the tank when the air injection is (temporarily) turned off.

4. Processed Nutrient Rich Water Holding Tank 92
a. The Nutrient Rich water in this tank, used to support the plant life in the Suspended Hydroponic Planter and Irrigation System, is circulated through an open pipe 94 extending along the entire length of the South wall of the greenhouse, directly behind the Nutrient Reservoirs 42 of the Suspended Hydroponic Planter and Irrigation System, looping back, and returning in the same holding tank
b. This designed looping circulation serves two purposes
   i. It helps by aerating the water to continue to advance the nitrification process
   ii. It serves as a delivery method to provide supplemental nutrients to the Nutrient Reservoirs 42 of the Suspended Hydroponic Planter and Irrigation System.

The flow of Nutrient Rich Water into the Nutrient Tanks 42 can be controlled by a manual valve or automated by using a dosing pump (not shown) connected to pipes 94.

Figure 5:
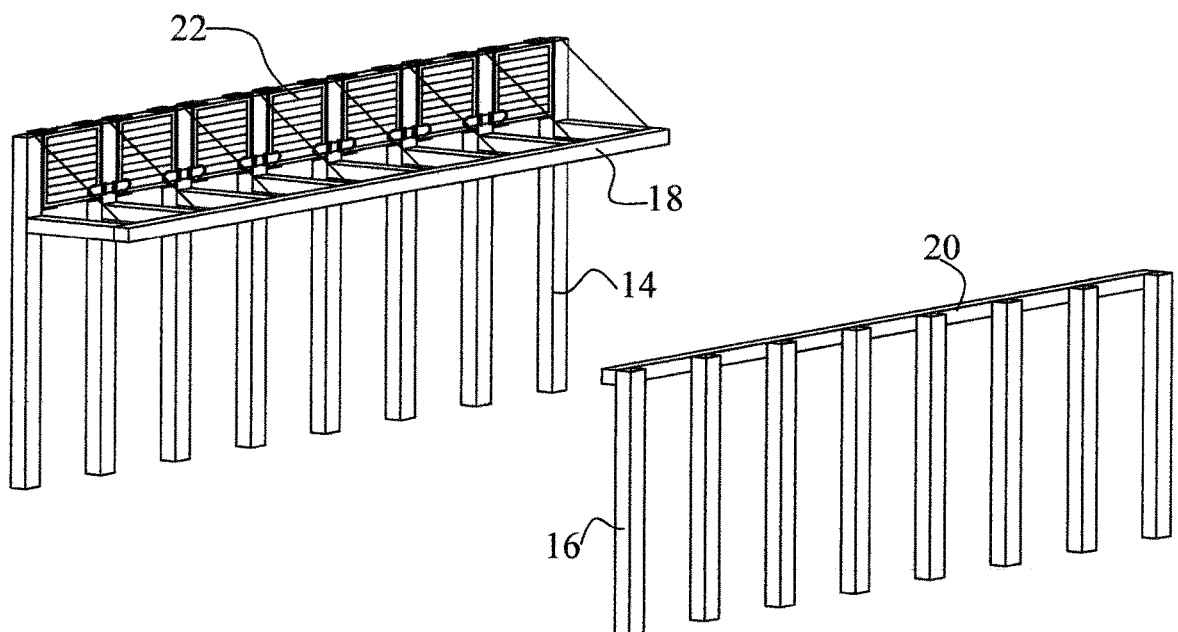
FIG. 5 is an orthogonal view of the front and rear wall structures of the greenhouse in the preferred embodiment of the present disclosure.
Figure 6:
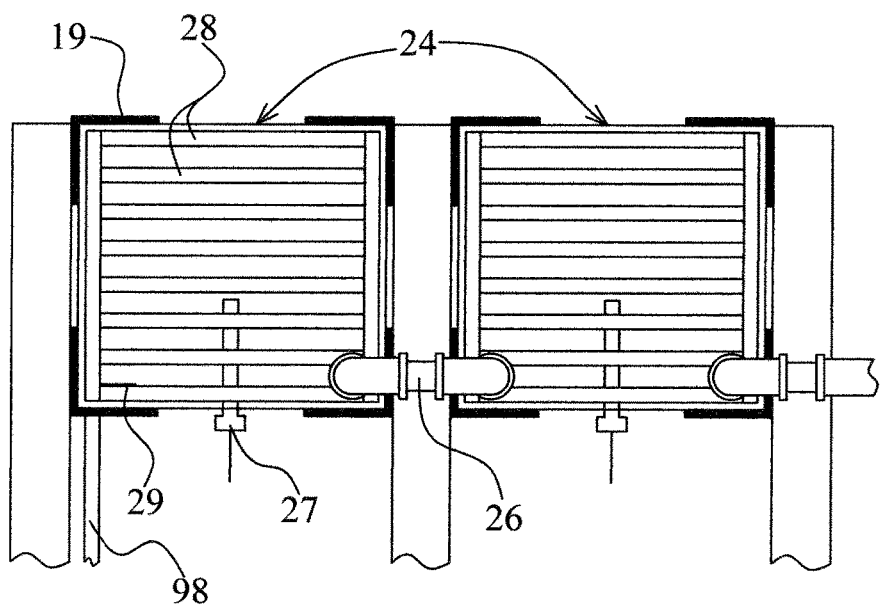
FIG. 6 is a close-up view of the water reservoir system of FIG. 5 in the preferred embodiment of the present disclosure.

North & South Wall Support Structures:
   As shown in FIG. 5, these Structures consist of two sets of vertical support beams 14 and 16, respectively, preferably along the North and South walls. On the North Wall Structure, there is a horizontal awning-style structure 18, and a set of brackets 19 mounted on the inside faces of the support beams. The horizontal structure 18 ensures that enough vertical space is reserved along the north wall to allow a scissor-lift, for example, to traverse the length of the greenhouse without disturbing the planters above. However, if the height of the greenhouse is sufficient, the vertical space along the north wall is not a concern and the horizontal structure is not necessary. On the South Wall Structure, there are horizontal support beams 20 connected at the top of the vertical support beams. These Support Structures serve two primary purposes:
   1. The mounted brackets on the North wall provide support for the Elevated Water Reservoir System 22.
   2. The North and South Wall Structures provide support for the Suspended Hydroponic Planter and Irrigation System (FIG. 10).

Elevated Water Reservoir System:
   This system shown in FIG. 5 and in a close-up view in FIG. 6, mounted at the top of the North Wall Support Structure, consists of five components:
   1. Water Reservoirs 24
   2. Plumbing 26 to connect each of the reservoirs
   3. Electric Tank Heaters 27
   4. Enclosed PVC piping 28 filled with Phase Changing Material (PCM)
   5. Two electric submersible water pumps 29 (one inside the Filter Water Holding Tank 84, not shown, and one at the opposite end, within the Elevated Reservoir Tank)

The Elevated Water Reservoir System 22, coupled with the Hydronic Radiant Flooring System and both Geothermal Heat Exchange Systems, serves one primary purpose: Provide controlled and consistent temperature throughout the greenhouse.

This System utilizes the water that flows through the Fish Tank 12 to absorb heat in the hotter parts of the greenhouse, redistributing the warmer water to the cooler parts of the greenhouse.

Its role in this process is as follows:
   1. Filtered Water, pumped from the Fish Tank, enters the Elevated Water Reservoir System 22 though the pipe 90 from the biofilter or through pipe 40 from the underground system.
   2. The chain of connected reservoirs 24 allows the water to travel from one end to the other through piping 26, naturally filling the entire Reservoir System to a controlled level.
   3. During the day (or when it is warm), solar and ambient heat energy is absorbed by the water as it traverses through the Reservoir System.
   4. At night (or when it is cold), the reservoirs are equipped with electric tank heaters 27 which provide a consistent water temperature when the temperature outside the reservoirs drops below a desired point.

5. Additionally, each reservoir houses an independent cluster of closed tubing 28. The tubing is surrounded by the water in the reservoir. The closed tubing 28 contains an organic Phase Changing Material (PCM) used to store heat energy, created by the sun during the day, that is naturally released when the temperature drops below a specific point, keeping the water within the reservoirs at a steady temperature
   i. This point, along with the total storage capacity of the PCM, are based on the specific properties of the PCM chosen.

The water exits the Reservoir System through a pump 29, in one embodiment, located in the reservoir furthest from the entry piping 90 or 40, which pumps the water through piping 98 directly into the connected Hydronic Radiant Flooring System, collecting the passive heat in the upper, hotter, parts of the greenhouse and evenly distributing it to the lower, cooler, parts of the greenhouse, where it returns to the Fish Tank 12. A second pump, not shown, would be located in the Filtered Water Holding Tank 84. Perhaps only a single water pump would be sufficient for the entire system. This single water pump 29 could be located at the lowest point in the system, for example, near the fish tank (as seen in FIG. 9), or in the Filtered Water Holding Tank 84.

Figure 7A:
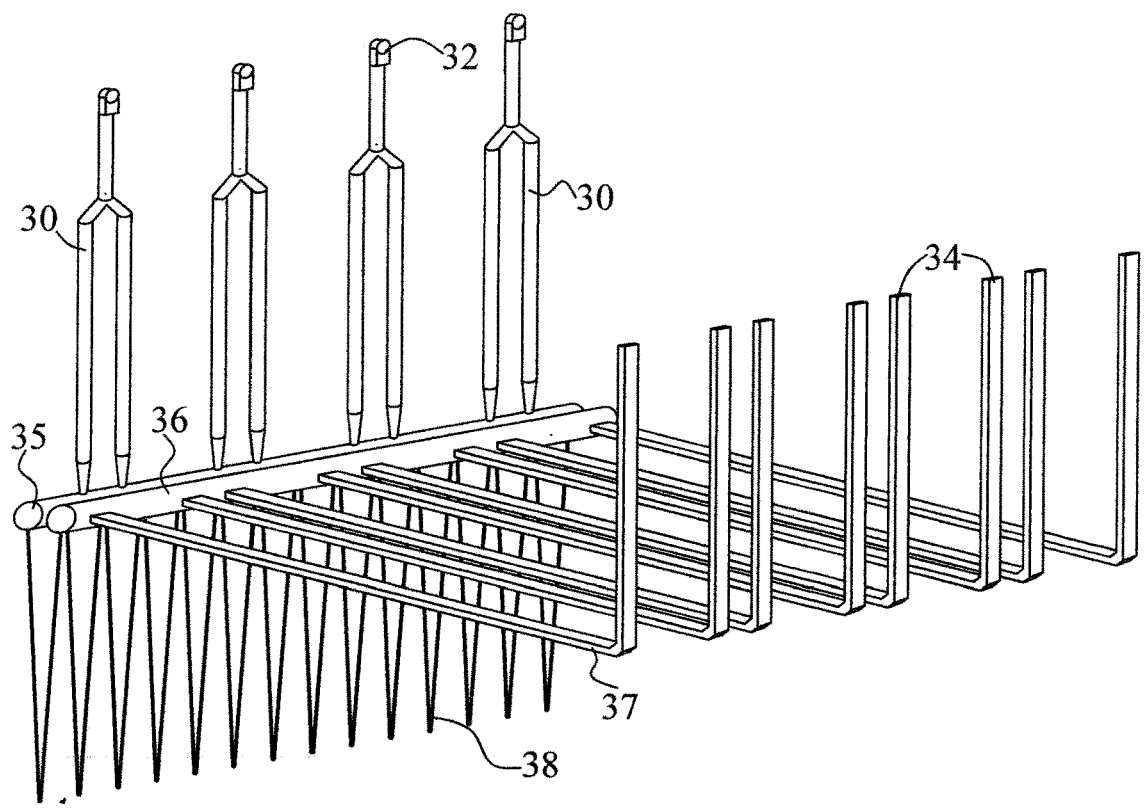
FIGS. 7A and 7B are orthogonal views of two alternative configurations of the air geothermal heat exchange system in the preferred embodiment of the present disclosure.
Figure 7B:
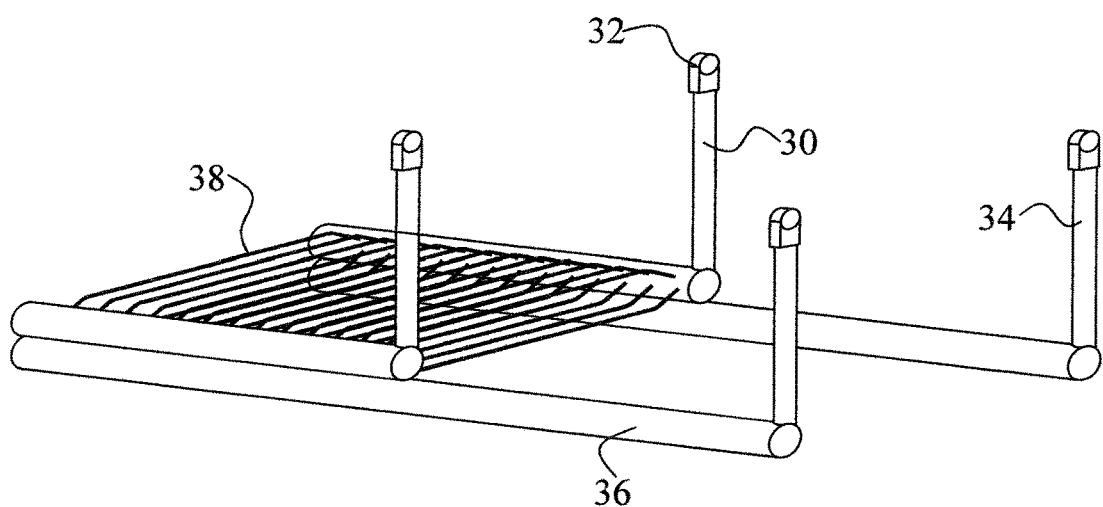

Geothermal Heat Exchange System—Air:

This System is shown in two alternatives in FIGS. 7A and 7B. The FIG. 7A alternative is preferred. The system is comprised of four components:

1. Inlet Ducts 30
   In FIG. 7A, four inlet ducts 30 are shown evenly spaced along the North Wall, extending towards the top of the greenhouse and connected to one another by horizontal tubing 35.
2. Inline Duct Fans 32
   Each Connected to one of the Inlet Ducts
3. Outlet Ducts 34
   Eight Outlet Ducts are shown evenly spaced along the South Wall, extending to the lower parts of the greenhouse
4. A network of underground tubing
   Tubing 35 connects to one end of each vertical loop 38. Parallel horizontal tubing 36 connects to the other end of each vertical loop 38 and connects to perpendicular horizontal tubing 37 connecting to the outlet ducts 34. This allows the air to flow in through the inlet ducts 30, along the North Wall, down the vertical loops 38, up the vertical loops 38 to tubing 36, through tubing 37 under the greenhouse, and to the Outlet Ducts 34.

In the alternative shown in FIG. 7B, inlet ducts 30 are placed in the corners of the North Wall, extending towards the top of the greenhouse. An inlet duct fan 32 is connected to each of the Inlet Ducts. Outlet Ducts 34 are placed in the corners of the South Wall, extending to the lower parts of the greenhouse. Tubing 38 is placed outside the footprint of the greenhouse, in the shadow of the North Wall. Air flows in through inlet ducts 30, through underground tubing 38, and out through outlet ducts 34.

This system serves one purpose: Pull hot air from the top of the greenhouse, through the underground network of tubes, and out as cooler air to the lower parts of the greenhouse.

This process, in combination with the Hydronic Radiant Flooring System, provides evenly distributed heating and cooling through the entire greenhouse. As the temperature in the upper parts of the greenhouse rises above a specified temperature:

1. The inline fans 32 connected to the inlet ducts 30 begin to draw hot air through to the network of underground tubing 36, 37, 38.
2. The cool subterranean air is pushed through to the Outlet Ducts 34 and out to the lower parts of the greenhouse This process works to regulate the temperature within the greenhouse in two ways:

1. By effectively replacing hotter air with colder air within the greenhouse, and cooling the air as it passes through the underground network of tubes
2. By greatly reducing (or eliminating) rising temperatures of the water in the in-floor tubing as it passes through the Hydronic Radiant Flooring System and the cooler air is pumped out of the Outlet Ducts and settles to the floor of the greenhouse. By transferring the heat energy of the water though the Radiant Flooring System, the water will be cooled rather than continuing to be heated. Once the desired temperature within the greenhouse is reached the inline fans are turned off.

In the preferred embodiment of FIG. 7A, four inlet ducts and eight outlet ducts are shown. Generally, there should be two outlet ducts for each inlet duct.

Figure 8:
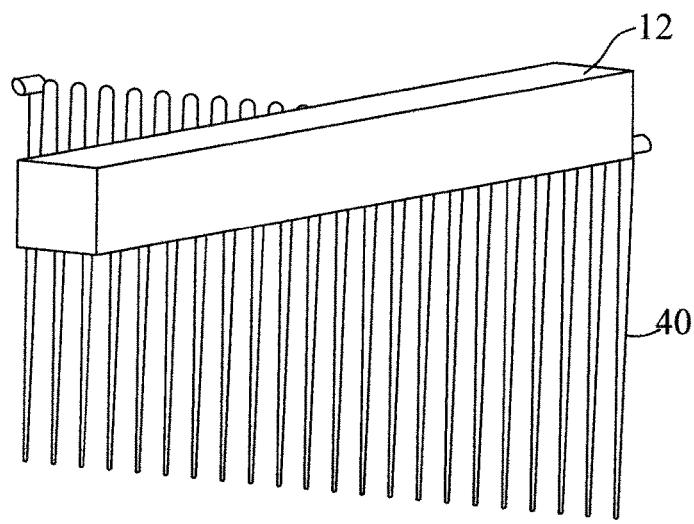
FIG. 8 is an orthogonal view of the water geothermal heat exchange system in the preferred embodiment of the present disclosure.

Geothermal Heat Exchange System—Water:

This System, shown in FIG. 8, consists of a network of underground tubing 40 positioned between the Fish Tank 12 and the Elevated Reservoirs 24. It helps to regulate the temperature of the water flowing between the Fish Tank and the Elevated Reservoirs 24 by optionally diverting the water into a network of underground tubing 40.

As warm water from the Fish Tank flows through the network of underground tubing 40, it cools and exits into the Elevated Reservoir System 22 at the same exit point as water flowing directly between the Fish Tank and Elevated Reservoir System. The same pump is used to create the direct (Fish Tank→Elevated Reservoirs) and indirect (Fish Tank-→Network→Elevated Reservoirs) water flows and a valve is used to divert the water flow either directly or indirectly. A direct water flow would be used to maintain or facilitate rising of the water temperature. An indirect water flow would be used to cap or lower the water temperature. FIG. 4 shows the water piping. A direct water flow would go from the tank 12 to the biofilter system 70 through pipe 90 to the elevated reservoir system 22. An indirect flow would go form the fish tank 12 through the biofilter system 70, through the underground piping 40 to the elevated reservoir system 22.

Hydronic Radiant Flooring System:

This System, shown in FIG. 9, consists of a series of in-floor Cross-linked polyethylene (PEX) tubing, for example. This type of tubing is commonly used in Radiant Flooring applications. The inlet point of tubing 50 is connected to the exit point of the Elevated Reservoir System 22 and the outlet point dumps back into the Fish Tank 12. These could be one or more actual pipes. The primary purpose of this System is to efficiently redistribute heat energy collected in the Elevated Water Reservoir System 22 to the flooring of the greenhouse. Once the water enters this system, it plays a critical role in facilitating both heating and cooling of the greenhouse.

Heating:

While the greenhouse is heating up, water from the Elevated Reservoir System 22 absorbs heat by either ambient/solar heat, or tank heaters, to a desired temperature. As the water circulates through the in-floor PEX tubing 50, the heat energy is evenly redistributed to the rest of the greenhouse.

Cooling:

Once the desired temperature is reached, the Air Geothermal Heat Exchange System begins drawing hot air from the top of the greenhouse, and pushing cooler air to the lower parts of the greenhouse. The effect of the cool air as it settles to the lower parts of the greenhouse will keep the ground temperature from continuing to rise, and at a steady temperature which, in turn, prevents the water temperature from continuing to rise, and at a steady temperature, as it passes through the in-floor tubing 50.

Figure 11:
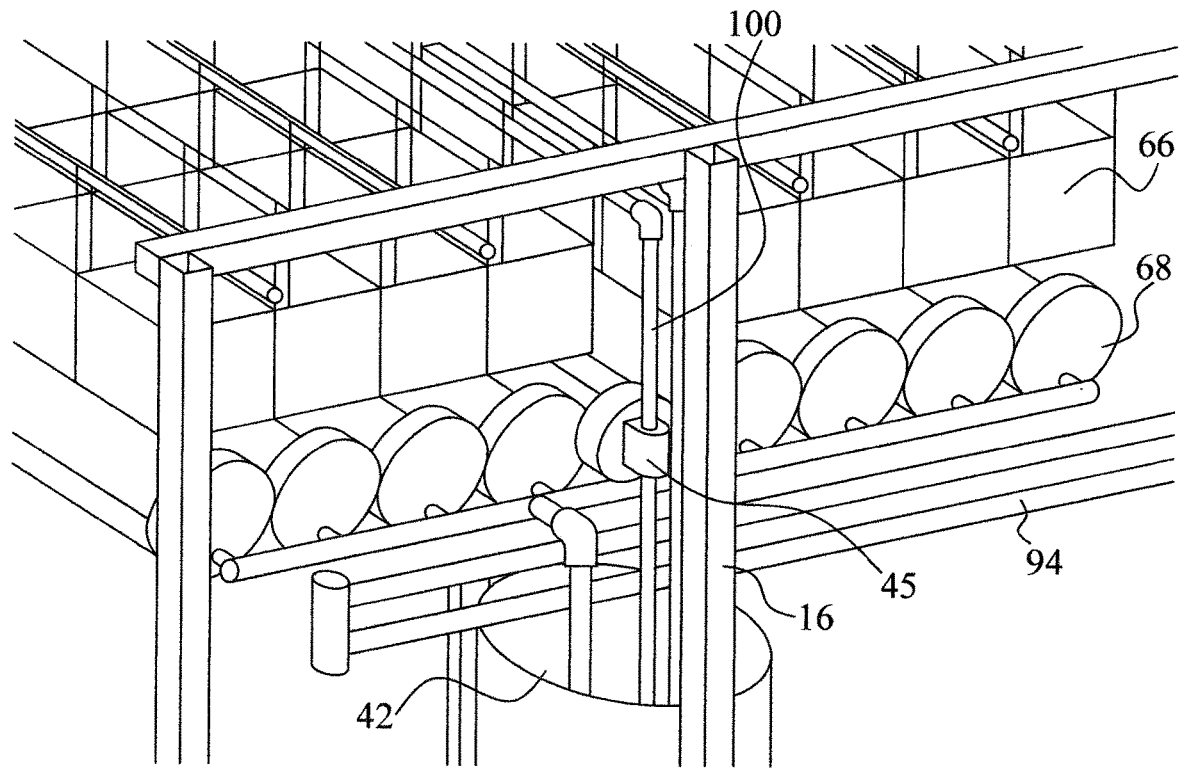
FIG. 11 is an enlarged view of a second portion of the suspended hydroponic planters in the preferred embodiment of the present disclosure.

Suspended Hydroponic Planter and Irrigation System:

This System is shown in FIG. 1 and in enlarged views in FIGS. 10 and 11. FIG. 10 shows a portion of the Suspended Hydroponic Planters and Irrigation System nearest to the Elevated Reservoir System 22. FIG. 11 shows a portion of the Suspended Hydroponic Planters and Irrigation System nearest to the Nutrient tanks 42.

This system consists of two main components:
1. The Suspended Hydroponic Planters 60, consisting of:
   a. Planter Cables 62
      i. Connect at the top of the North Wall Overhang Support Structure and at the bottom of the South Wall Support Structure
   b. Planter Harnesses 64
      i. Securely connected along cables which are mounted to the North and South Wall Structures
   c. Planter Pots 66
      i. Pots sit within each Planter Harness (one pot per harness)
   d. Planter Pot Drainage Line 68
      i. Each pot is connected to the pot directly above and below it by a single drainage line located at the base of each pot
2. The Irrigation System, which consists of
   a. Irrigation plumbing 100 suspended along Planter Cables
   b. Nutrient Reservoirs 42 located near the edge of the Fish Tank
   c. A direct line from the Elevated Reservoirs 24 to the Nutrient Tanks 42 controlled by a motorized open/close valve 45 (shown in FIG. 13).

The purpose of this system is also multifaceted:
1. The Suspended Hydroponic Planters
   a. Greatly increase the amount of usable floor space in the greenhouse.

Figure 12:
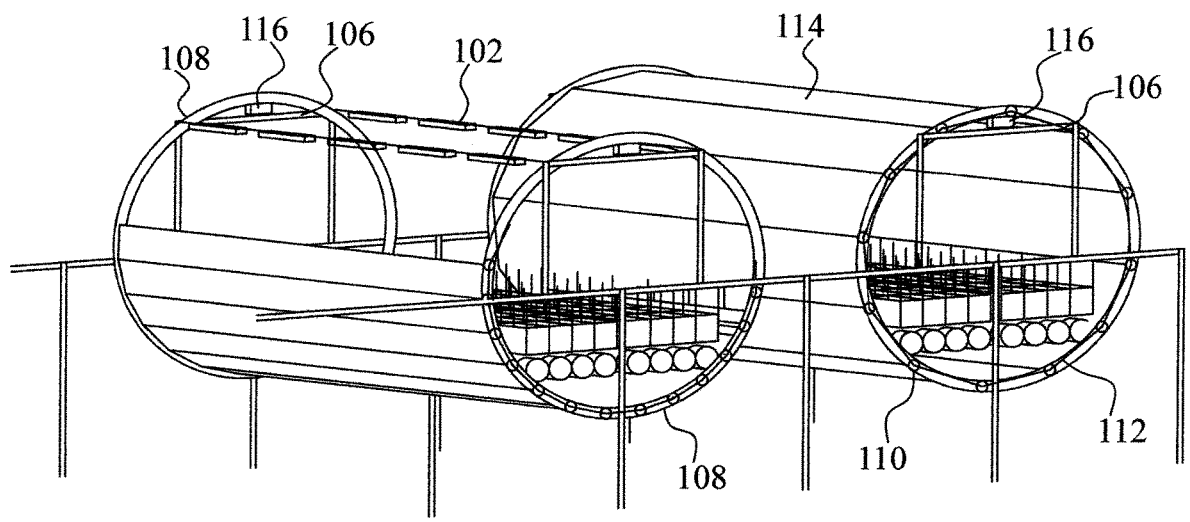
FIG. 12 is an enlarged view of a light deprivation curtain tunnel system and the suspended hydroponic planters in the preferred embodiment of the present disclosure.

The floor space beneath the suspended planters could be used for anything, for example, supplemental lighting and/or grow tents could be added to grow additional plants, including plant-life used to support the aquaculture. Other possible uses include a staging area for young plants to be transplanted later into the Suspended Planters, additional aquariums could be set up to breed and raise aquaculture used to ensure a continuous cycle, and composting worms could be farmed to help break down remaining bio-matter from the Fish Tank and plant matter from the Planters.

b. Water is returned by gravity (no return pump)
      i. As nutrient solution is delivered to each individual planter (by way of pumping water from the Nutrient Reservoir 42 up through the irrigation system), the water that is not absorbed by the plants is returned back to the Nutrient Reservoir (decoupled), or back to the Fish Tank 12 (coupled). FIGS. 11 and 12 illustrate the decoupled configuration.

c. Planter rows can be individually configured to grow different crops, including food grown to support the aquatic life (Self Sustaining).
   d. Each cluster of "Planter Rows" are separated by a gap wide enough to allow for a "mobile scissor lift," for example, to traverse the rows from the ground level, allowing easy access to the plants suspended above.
2. The Irrigation System
   a. Waste produced by the aquatic life in the fish tank is collected by the connected biofilter and held in the Processed Nutrient Rich Water Holding Tank 92.
   b. Once processed, the resulting nutrient solution is delivered first to the Nutrient Tanks 42 by way of the piping 94, and then to the plants in the hydroponic planters through the irrigation plumbing suspended along the cables.
   c. The return water can be directed back to the Nutrient Tank to create a decoupled loop (separating the Plant Loop from the Fish Loop).
   d. The return water can be directed back to the Fish Tank to create a coupled loop (connecting the Plant Loop and the Fish Loop).
   e. This System is also equipped with a water line from the Elevated Reservoirs 24 to the Nutrient Tanks 42. This water flows out of the reservoirs by gravity, controlled by the valve 45 above the Nutrient Tanks.
      i. In combination with the plumbing of the Biofiltration System which provides Nutrient Rich Water to the Nutrient Tanks, the concentration of the Nutrient Solution of the water in these Tanks can be easily controlled by adding filtered water from the Elevated Reservoirs (to decrease the concentration) or by adding Nutrient Rich Water from the Biofiltration System (to increase the concentration).

Figure 14:
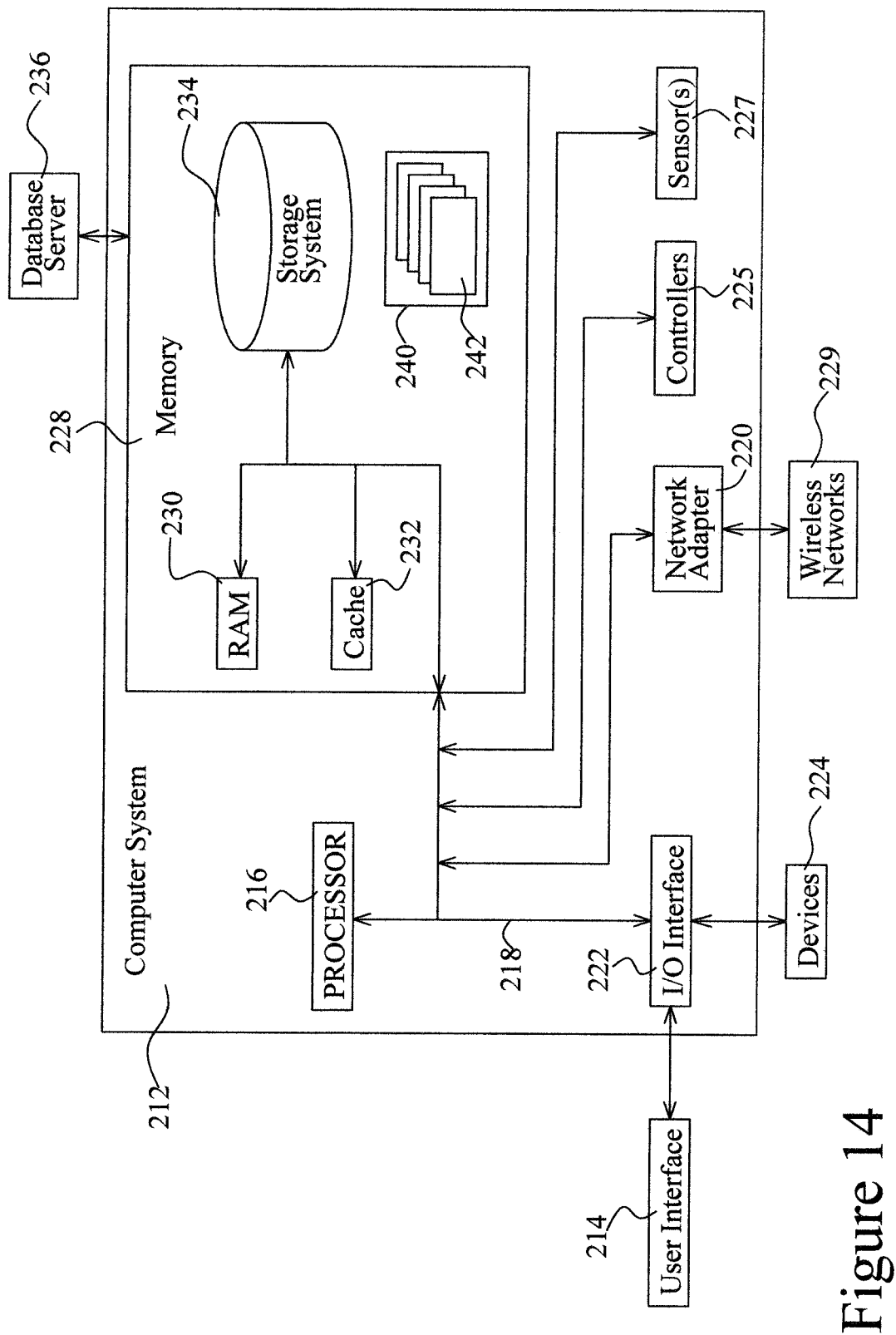
FIG. 14 is a block diagram illustration of the automation system in the preferred embodiment of the present disclosure.

Light Deprivation Curtain Tunnel System:

As shown in FIG. 12, this System Consists of:
1. Strut Channel
   a. Mounted in matching pairs, open channels 108 facing each other, on the North and South Wall Support Structures
   b. Channels form a complete circular rail system 108 around the Suspended Planters encompassing each group of Planters
      i. Allows bearing based trolleys 110 to move freely within the channel
2. Trolleys
   a. Pairs of Trolleys 110 within each pair of channels are connected by a nylon strap 112 at each end of the greenhouse, connecting each pair of North and South Channels to form a Curtain Rail and a rib-like support structure which is used to attach the Blackout Curtains 114
3. Blackout Curtains
   a. Plastic or fabric curtains 114 designed to prevent light penetration are attached to the nylon straps 112 connecting the pairs of trolleys 110 at each end of the greenhouse
4. Motors and Motor Driver 116
   a. Mounted at the peak of each curtain rail
   b. Used to open and close the curtains along the curtain rails
      i. To Close, the lead trolley on each side of the Curtain Rail is pulled upward until they reach the peak of the Curtain Rail, effectively closing the curtains ii. To Open, the lead trolley on each side of the Curtain Rail is pulled downward until they are below the tops of the planter pots, effectively opening the curtains 5. Curtain Rail Mounting Structure 106
   b. Attaches the Curtain Rails directly to the North and South Support Structures
   c. Used to support supplemental lighting 102 attached along cable wires connected at each end of the greenhouse Automation System:

As illustrated in FIG. 14, the Automation System is a computer system 212, a computing node of a cloud computing environment, or a non-cloud computing environment. Computer system 212 may include one or more processors 216, a system memory 228, and bus 218 that couples system components including system memory 228 to processor 216. System memory 228 may include any kind of computer system readable memory, such as random access memory (RAM) 230 and/or cache memory 232. Storage system 234 can be any kind of removable or non-removable memory system. One or more programs 240 having a set of program processes 242 may be stored in memory 228. Database server 236 or multiple servers may interface with the memory system 234. Computer system 212 may communicate with one or more external devices such as a keyboard, display, and so on as a user interface 214. One or more network adaptors 220 may be provided to communicate with the Internet through wireless networks 229, for example. In addition, the following Automation System components are provided:

1. Controllers and Microcontrollers 225
2. Devices 224
   a. Motor Drivers
   b. Pulse-width modulators
   c. AC relays
   d. Water Pumps
   e. Dosing Pumps
   f. Fans
   g. Lights
   h. Diffusers (Aquarium)
   i. Aquarium Heating Elements
   j. Water Flow Meter
   k. Ball & Solenoid Valves
3. Sensors 227
   a. Temperature (air & water)
   b. Humidity
   c. Pressure
   d. CO2 (air)
   e. Oxygen (water)
   f. pH (water)
   g. TDS (Total Dissolved Solids)
   h. Water Level
   i. Proximity
   j. LUX meter (light)
   k.

The database server 236 is used to collect and store real time data received over the network 229, sent from the controllers and microcontrollers 225, which are connected to the devices 224 and sensors 227 providing the data. As real time data is being collected, it is also being stored and can be accessed to provide historical information of the same data.

Additionally, the database contains digital representations of the controllers' and microcontrollers' physical configurations, and the configurations of the devices to which they are connected, in a way that allows each controller to "insert" data into the database specifically related to that controller, and "retrieve" data from the database related to each of the other controllers for which it is configured, effectively enabling communication between controllers by way of the centralized database.

Communication between the controllers and microcontrollers enables each of the greenhouse's subsystems to operate in manual and automatic modes which can be accessed, defined, and controlled, through a browser-based user interface 214.

This User Interface allows an end user to define modes of operation, set alarms, create schedules, monitor and modify the state of the entire greenhouse and each of its subsystems, as well as monitor and view graphical representations of any active (real time) and inactive (archived) historical data being collected.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter and the appended claims.

What is claimed is:

1. An aquaponic greenhouse comprising:
   a plurality of hydroponic planters within said aquaponic greenhouse, each said hydroponic planter suspended from a planter cable connected between two opposite support structures;
   at least one aquatic tank configured to support aquatic life;
   an irrigation system linking said one or more hydroponic planters and said at least one aquatic tank;
   a biofilter configured to process waste from said aquatic life to be used to provide nutrients to plants in said one or more hydroponic planters;
   a water geothermal heat exchange system comprising a first network of underground tubing between said at least one aquatic tank and elevated water reservoirs, wherein said elevated water reservoirs are configured to receive water pumped from said at least one aquatic tank wherein said first network of underground tubing is placed outside a footprint of said greenhouse, and wherein a temperature of said water pumped through said network of underground tubing into said elevated water reservoirs is decreased to within a specific range;
   a hydronic radiant flooring system comprising a series of in-floor tubing configured to have water flowing therethrough, linking said at least one aquatic tank through elevated water reservoirs to said hydronic radiant flooring system, wherein said in-floor tubing is above ground level; and
   an air geothermal heat exchange system comprising at least two inlet ducts located at one inside wall of said greenhouse and extending towards a top of said greenhouse, at least two outlet ducts located at an opposite inside wall of said greenhouse and extending to lower parts of said greenhouse, an inlet duct fan connected to each of said inlet ducts, and a second network of underground tubing connecting said inlet ducts to said outlet ducts wherein said inlet duct fans are configured to pull air from said top of said greenhouse through said second network of underground tubing where said air is cooled and thereby releasing cooler air through said outlet ducts;
   wherein said hydronic radiant flooring system redistributes heat energy collected in said elevated water reservoirs through said in-floor tubing throughout said greenhouse and wherein said water geothermal heat exchange system. said air geothermal heat exchange system, and said hydronic radiant flooring system configured together regulate air and water temperatures within said greenhouse.

2. The aquaponic greenhouse according to claim 1 wherein a temperature of water in said at least one aquatic tank is configured to be regulated within a specific range to facilitate optimal conditions for said aquatic life.

3. The aquaponic greenhouse according to claim 1 wherein a temperature of air in said greenhouse is configured to be regulated within a specific range to facilitate optimal growing conditions for said plants in said greenhouse.

4. The aquaponic greenhouse according to claim 3,
said hydronic radiant flooring system comprising said series of in-floor tubing having an inlet point connected to an exit point of said series of elevated water reservoirs and having an outlet point at said at least one aquatic tank wherein said hydronic radiant flooring system is configured to redistribute heat collected in said series of elevated water reservoirs to flooring of said greenhouse to regulate said air temperature within said specific range.

5. The aquaponic greenhouse according to claim 1 wherein said water geothermal heat exchange system further comprises:
a heating mechanism associated with said series of elevated water reservoirs wherein a temperature of said water pumped into said elevated water reservoirs is increased to within said specific range.

6. The aquaponic greenhouse according to claim 5 wherein said heating mechanism comprises an electric tank heater on each of said series of elevated water reservoirs.

7. The aquaponic greenhouse according to claim 5 wherein said heating mechanism comprises within each of said series of elevated water reservoirs, an independent cluster of closed tubing containing an organic Phase Changing Material configured to store heat energy created by the sun entering said greenhouse and to release said heat energy into said water when the temperature drops below a specific point, keeping said water within said elevated water reservoirs at a steady temperature.

8. The aquaponic greenhouse according to claim 1 for each one of said plurality of hydroponic planters further comprising:
a plurality of planter pots, each sitting within a planter harness connected along said planter cable, wherein each planter pot is connected to a pot directly above and directly below it by a drainage line located at a base of each planter pot;
an individually controllable light deprivation tunnel system encompassing only one of said plurality of hydroponic planters suspended from said planter cable having light penetration blocking curtains between said two opposite support structures, configured to be opened or closed via a motor to control a light cycle provided to plants in said only one of said plurality of hydroponic planters;
plumbing lines of said irrigation system suspended along said planter cable; and
at least one nutrient reservoir tank located near an edge of said at least one aquatic tank configured to receive said nutrients from said biofilter wherein said irrigation plumbing lines are configured to deliver said nutrients from said at least one nutrient reservoir to said only one of said plurality of hydroponic planters.

9. The aquaponic greenhouse according to claim 8 wherein said irrigation system is configured to pump water from said at least one nutrient reservoir to each of said planter pots wherein water not absorbed by plants in said planter pots is returned to said at least one nutrient tank.

10. The aquaponic greenhouse according to claim 8 wherein said irrigation system is configured to pump water from said at least one nutrient reservoir to each of said planter pots wherein water not absorbed by plants in said planter pots is returned to said at least one aquatic tank.

11. An aquaponic greenhouse comprising:
a plurality of hydroponic planters within said aquaponic greenhouse, each said hydroponic planter suspended from a planter cable connected between two opposite support structures and each hydroponic planter comprising a plurality of planter pots, each sitting within a planter harness connected along said planter cable;
a plurality of individually controllable light deprivation tunnel systems, each encompassing only one of said plurality of hydroponic planters suspended from said planter cable having light penetration blocking curtains between said two opposite support structures, configured to be opened or closed via motors manually or automatically using motor drivers, controllers, and lighting sensors to control a light cycle provided to said only one of said hydroponic planters;
at least one aquatic tank configured to support aquatic life;
an irrigation system linking said one or more hydroponic planters and said at least one aquatic tank;
a biofilter configured to process waste from said aquatic life to be used to provide nutrients to plants in said one or more hydroponic planters;
a series of water reservoirs connected to said at least one aquatic tank wherein said series of water reservoirs is configured to receive water pumped from said at least one aquatic tank;
a heating mechanism associated with said series of water reservoirs wherein a temperature of said water pumped into said water reservoirs is increased to within a specific range;
a network of underground tubing between said at least one aquatic tank and said series of water reservoirs wherein a temperature of said water pumped through said network of underground tubing into said water reservoirs is decreased to within a specific range;
a hydronic radiant flooring system comprising a series of in-floor tubing configured to have water flow therethrough, wherein said in-floor tubing is above ground level, having an inlet point connected to an exit point of said series of water reservoirs and having an outlet point at said at least one aquatic tank wherein said hydronic radiant flooring system is configured to redistribute heat collected in said series of water reservoirs to flooring of said greenhouse to provide air temperature within a specific range;
at least two inlet ducts located at one inside wall of said greenhouse and extending towards a top of said greenhouse;
at least two outlet ducts located at an opposite inside wall of said greenhouse and extending to lower parts of said greenhouse;
an inlet duct fan connected to each of said inlet ducts; and
a network of underground tubing placed outside a footprint of said greenhouse and connecting said inlet ducts to said outlet ducts wherein said inlet duct fans are configured to pull air from said top of said greenhouse through said network of underground tubes where said air is cooled and thereby releasing cooler air through said outlet ducts.

12. The aquaponic greenhouse according to claim 11 for each one of said plurality of hydroponic planters further comprising:
   each planter pot connected to a pot directly above and directly below it by a drainage line located at a base of each planter pot;
   plumbing lines of said irrigation system suspended along said planter cable; and
   at least one nutrient reservoir located near an edge of said at least one aquatic tank configured to receive said nutrients from said biofilter wherein said irrigation plumbing is configured to deliver said nutrients from said at least one nutrient reservoir to said one of said plurality of hydroponic planters.

13. The aquaponic greenhouse according to claim 12 wherein said irrigation system is configured to pump water from said at least one nutrient reservoir to each of said planter pots wherein water not absorbed by plants in said planter pots is returned to said at least one nutrient tank.

14. The aquaponic greenhouse according to claim 12 wherein said irrigation system is configured to pump water from said at least one nutrient reservoir to each of said planter pots wherein water not absorbed by plants in said planter pots is returned to said at least one aquatic tank.

15. An aquaponic greenhouse having an automation system comprising:
   a plurality of hydroponic planters within said aquaponic greenhouse, each hydroponic planter suspended from a planter cable connected between two opposite support structures and each hydroponic planter comprising a plurality of planter pots, each sitting within a planter harness connected along said planter cable;
   a plurality of individually controllable light deprivation tunnel systems, each encompassing only one of said plurality of hydroponic planters suspended from said planter cable having light penetration blocking curtains between said two opposite support structures, configured to be opened or closed via a motor to control a light cycle provided to said only one of said plurality of hydroponic planters;
   at least one aquatic tank configured to support aquatic life;
   an irrigation system linking said plurality of hydroponic planters and said at least one aquatic tank;
   a biofilter configured to process waste from said aquatic life to be used to provide nutrients to plants in said plurality of hydroponic planters;
   a water geothermal heat exchange system comprising a first network of underground tubing between said at least one aquatic tank and elevated water reservoirs, wherein said elevated water reservoirs are configured to receive water pumped from said at least one aquatic tank, wherein said first network of underground tubing is placed outside a footprint of said greenhouse, and wherein a temperature of said water pumped through said network of underground tubing into said elevated water reservoirs is decreased to within a specific range;
   a hydronic radiant flooring system comprising a series of in-floor tubing, configured to have water flow therethrough, linking said at least one aquatic tank through said elevated water reservoirs to said hydronic radiant flooring system;
   an air geothermal heat exchange system comprising at least two inlet ducts located at one inside wall of said greenhouse and extending towards a top of said greenhouse, at least two outlet ducts located at an opposite inside wall of said greenhouse and extending to lower parts of said greenhouse, an inlet duct fan connected to each of said inlet ducts, and a second network of underground tubing connecting said inlet ducts to said outlet ducts wherein said inlet duct fans are configured to pull air from said top of said greenhouse through said second network of underground tubing where said air is cooled and thereby releasing cooler air through said outlet ducts, said water geothermal heat exchange system, said air geothermal heat exchange system, and said hydronic radiant flooring system configured together to regulate air and water temperatures within said greenhouse;
   and said automation system comprising:
      a plurality of sensors and devices connected to a plurality of controllers and microcontrollers;
      a database server configured to collect and store real time data sent from said controllers;
      a computer processor configured to provide communication between said controllers and microcontrollers wherein each of said controllers and microcontrollers is configured to operate in manual and automatic modes; and
      a user interface configured to allow a user to monitor and access data and set modes of operation.

16. The aquaponic greenhouse according to claim 15 wherein said plurality of sensors comprises one or more of: air temperature sensors, water temperature sensors, humidity sensors, CO2 sensors, water oxygen content sensors, water pH sensors, total dissolved solids sensors, water level sensors, proximity sensors, and light sensors.

17. The aquaponic greenhouse according to claim 15 further comprising devices including one or more of motor drivers, pulse-width modulators, AC relays, water pumps, dosing pumps, fans, lights, aquarium diffusers, aquarium heating elements, ball valves, solenoid valves, and water flow meters.

18. The aquaponic greenhouse according to claim 15 wherein said user interface is further configured to allow a user to set alarms, create schedules, monitor and modify a state of said entire greenhouse and each of its subsystems, and monitor and view graphical representations of real time and archived historical data being collected.

* * * * *